US008645456B2

United States Patent
Li et al.

(10) Patent No.: US 8,645,456 B2
(45) Date of Patent: Feb. 4, 2014

(54) CONTENT ACCESS POLICY MANAGEMENT FOR MOBILE HANDHELD DEVICES

(75) Inventors: Zhi Li, San Ramon, CA (US); Raghvendra Savoor, Walnut Creet, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 509 days.

(21) Appl. No.: 12/332,264

(22) Filed: Dec. 10, 2008

(65) Prior Publication Data

US 2010/0146585 A1 Jun. 10, 2010

(51) Int. Cl.
*G06F 15/16* (2006.01)

(52) U.S. Cl.
USPC .......................................... 709/202; 709/229

(58) Field of Classification Search
USPC ....................................................... 709/202
See application file for complete search history.

(56) References Cited

U.S. PATENT DOCUMENTS

| 6,915,328 | B2* | 7/2005 | Turnbull ........................ 709/203 |
| 2003/0120593 | A1* | 6/2003 | Bansal et al. .................... 705/39 |
| 2004/0215757 | A1* | 10/2004 | Butler ............................ 709/223 |
| 2005/0015365 | A1* | 1/2005 | Kavacheri et al. ................ 707/3 |
| 2006/0031387 | A1* | 2/2006 | Hamzeh et al. ................. 709/217 |
| 2008/0155400 | A1* | 6/2008 | Christensen .................... 715/273 |
| 2008/0183699 | A1* | 7/2008 | Hu et al. ............................ 707/5 |
| 2008/0214154 | A1* | 9/2008 | Ramer et al. ............... 455/414.1 |
| 2009/0222583 | A1* | 9/2009 | Josefsberg et al. ............ 709/245 |
| 2010/0070849 | A1* | 3/2010 | Sadan et al. ................... 715/234 |

* cited by examiner

*Primary Examiner* — Noel Beharry
(74) *Attorney, Agent, or Firm* — Hartman & Citrin LLC

(57) ABSTRACT

Devices and methods are disclosed which relate to a mobile communications device which presents a user with content optimized for the mobile communications device based on connection speed, device capabilities, and user preferences. When a user wishes to view content, the user inputs an address. The mobile communications device accesses a policy management agent. The policy management agent checks an onboard database of websites, their mobile counterparts, and attributes of each. An optimal website is selected and the mobile communications device requests content from that website instead.

18 Claims, 5 Drawing Sheets

REPLACEMENT SHEET

562 —

Mobile Versions of WEATHER.COM

| | | | |
|---|---|---|---|
| Address | www.weather.com | m.weather.com | wap.weather.com |
| Min. Resolution | 640X480 | 320X200 | N/A |
| Avg. Image Size | 50 kB | 5 kB | 0 kB |
| Images/Page | 20 | 6 | 0 |
| Avg. Page Size | 11 kB | 2 kB | <1 kB |
| FLASH | Yes | No | No |
| JAVA | Yes | Yes | No |

|  | > 3Mbps | 1 – 3 Mbps | .2 – 1 Mbps | < 200 kbps |
|---|---|---|---|---|
| Min. Res | No Limit | 320X240 | 320X240 | 320X240 |
| Avg. Img | No Limit | 70 kB | 10 kB | 5 kB |
| Img/Page | No Limit | No Limit | 5 | 3 |
| Avg. Page | No Limit | 20 kB | 10 kB | 5 kB |
| FLASH | Yes | No | No | No |
| JAVA | Yes | Yes | No | No |

CONTENT ACCESS POLICY MANAGEMENT FOR MOBILE HANDHELD DEVICES

BACKGROUND OF THE INVENTION

1. Field of the Invention

The present invention relates to mobile web browsing. More specifically, the present invention relates to providing optimized content to a mobile communications device.

2. Background of the Invention

Today there are many ways to access the internet and it can be done from practically anywhere. It may have been built for computers, but the internet can be accessed from a multitude of electronic devices including laptop computers, cellular telephones, personal digital assistants (PDAs), etc.

At the same time cellular telephones alone have become tremendously popular. It is estimated that at the end of 2007 the total worldwide subscriber rate reached 3.3 billion. Close to 80% of the world's population enjoys mobile telephone coverage, a figure that will only increase. As cellular telephones gain popularity, their functionality has increased also. Standard service includes voice calling, caller ID, call waiting, and voice mail. Service providers also offer text messaging, push mail, navigation, and even a high-speed internet connection directly to your telephone through the use of protocols such as those included in High Speed Packet Access (HSPA).

However, wireless access usually has limited bandwidth. At the same time traditional HTML-based web-pages usually have high bandwidth demand. People frequently complain about the slow access speed from wireless handheld devices, such as the recent release of IPHONE and soon expected GOOGLE Phone API (ANDROID). Wireless networks are improving in speed and bandwidth, but a mobile device itself can reduce the connection speed if its hardware cannot keep up with the data flow. This may not be as much of a problem for laptop computers and IPHONEs, but there are many other mobile communications devices that don't contain the fastest hardware.

To access Internet content, wireless handheld devices have four options at this time. The first option, accessing regular websites, is the simplest method, but this usually involves a large volume of data transmission. The second option is accessing through a wireless application protocol (WAP), which usually requires service providers to provide a proxy server to convert regular web-pages into a mobile version and provide service to wireless handheld devices. With this option, the service provider, rather than the owner of the site, is converting the site. The third option is direct access through mobile sites which are customized by the owner to provide content services to wireless devices. Yet another option exists for directly accessing closed network, or "walled garden", services. These services are set up by the service provider and only accessible by the service provider's customers.

Of all these options for accessing the same content in a website, users have a hard time selecting which one is best for them. There are many different mobile communications devices with different screen sizes, resolutions, input options, software capabilities, etc. Mobile communications devices may run on many different operating systems including WINDOWS MOBILE, SYMBIAN OS, PALM OS, etc. These operating systems do not support all the same types of application environments. For example some are best suited for JAVA applications while others are geared towards data processing. The web browsers associated with different mobile communications devices also have vastly different capabilities. Many devices are able to run JAVASCRIPT within a website, but FLASH content is scarcely supported on mobile communications devices.

Users of these devices have their own ideas about how content should be presented to them. Some users want their data fast, and do not care how pretty it looks. Other users would like as much information as possible, yet would sacrifice aesthetics for speed. Then there are users who just want a nice internet experience, with nice graphics and layout, and minimum content is satisfactory. Not all of these users choose their mobile communications device wisely, however, and so some users struggle to find the right version of the website they want to visit. The optimal website needs to have balance between the speed of the connection, the capability of the device, and the wants and needs of the user.

What is needed in the art is a content access policy manager that considers the mobile communications device hardware, network speed, and user preferences, and delivers the optimal website based on those considerations.

SUMMARY OF THE INVENTION

The present invention features a mobile communications device which presents a user with content optimized for the mobile communications device based on connection speed, device capabilities, and user preferences. When a user wishes to view content, the user inputs an address. The mobile communications device accesses a policy management agent. The policy management agent checks an onboard database of websites, their mobile counterparts, and attributes of each. An optimal website is selected and the mobile communications device requests content from that website instead.

Furthermore, the policy management agent and database receives updates. Each time the mobile communications device requests a new website, the server searches for alternate addresses that have the same content but formatted in different ways. If the website does not have any mobile counterparts, then a mobile website is created. The results of the search and any websites created are returned to the mobile communications device. The policy management agent is updated immediately and selects the optimal website based on the site data and user preferences. The server also updates the policy management agent with other mobile website information on a push basis, pull basis, or periodic basis.

In one embodiment, the present invention is a mobile communications device comprising a housing, a memory within the housing, a policy management agent within the memory, a display coupled to the housing; and a wireless transceiver in communication with the memory. The policy management agent intercepts a request for a regular website and provides an optimal website.

In another embodiment, the present invention is a mobile communications system comprising an application server, a wireless transceiver in communication with the application server, and a policy management database in communication with the application server. The application server collects attributes from websites and records the attributes to the policy management database.

In yet another embodiment, the present invention is a method of providing an optimal website for viewing on a mobile communications device, comprising intercepting a request for a regular website, selecting an optimal website, and forwarding a request for the optimal website.

BRIEF DESCRIPTION OF THE DRAWINGS

FIG. 5 shows a database entry of website versions, according to an exemplary embodiment of the present invention.

FIG. 6 shows a selection screen of user options for a content access policy management system, according to an exemplary embodiment of the present invention.

DETAILED DESCRIPTION OF THE INVENTION

The present invention features a mobile communications device which presents a user with content optimized for the mobile communications device based on connection speed, device capabilities, and user preferences. When a user wishes to view content, the user inputs an address. The mobile communications device accesses a policy management agent. The policy management agent checks an onboard database of websites, their mobile counterparts, and attributes of each. An optimal website is selected and the mobile communications device requests content from that website instead.

Furthermore, the policy management agent and database receives updates. Each time the mobile communications device requests a new website, the server searches for alternate addresses that have the same content but formatted in different ways. If the website does not have any mobile counterparts, then a mobile website is created. The results of the search and any websites created are returned to the mobile communications device. The policy management agent is updated immediately and selects the optimal website based on the site data and user preferences. The server also updates the policy management agent with other mobile website information on a push basis, pull basis, or periodic basis.

"Mobile communications device," as used herein and throughout this disclosure, refers to any portable device capable of wireless communication. Examples of mobile communications devices include cellular telephones, PDAs, laptop computers, two-way radios, walkie-talkies, etc.

"Regular website," as used herein and throughout this disclosure, refers to a website designed for a desktop computer or the like. A regular website can be referred to as a "full website", "primary website", or "non-mobile website." A regular website is usually the highest end, and most graphics and software intensive version that is available.

"Mobile website," as used herein and throughout this disclosure, refers to a website designed for a mobile or handheld device. A mobile website is one that contains substantially the same content as a regular website, but adapted for a smaller screen and less hardware and software capability. Some mobile websites are nothing but text and links. Examples of mobile websites include m.ebay.com, m.google.com, m.wired.com, m.facebook.com, etc.

Figure 1:
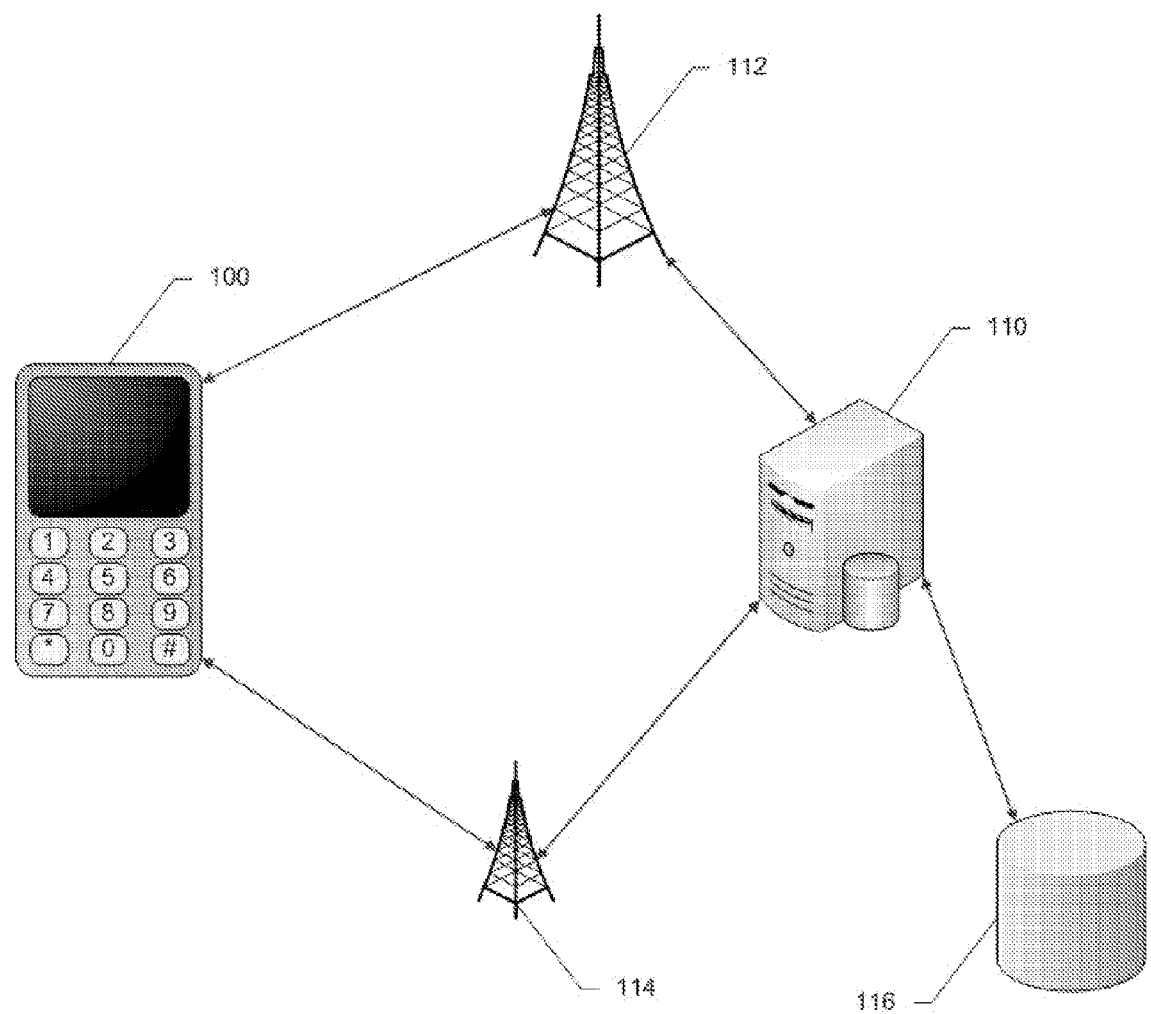
FIG. 1 shows a content access policy management system, according to an exemplary embodiment of the present invention.

FIG. 1 shows a content access policy management system, according to an exemplary embodiment of the present invention. In this embodiment, the system comprises an application server 110, a third party database 116, a cellular tower 112, a wireless access point 114, and a mobile communications device 100 with onboard policy management agent. Application server 110 is in communication with mobile communications device 100 through cellular tower 112 or wireless access point 114. Application server 110 tracks available websites which can be accessed by mobile communications device 100. There are many ways application server 110 does this. When mobile communications device 100 requests access to a website, application server 110 checks for mobile versions of the website. Application server 110 attempts popular mobile variations of the domain name; e.g. m.domain, mmm.domain, wap.domain, mobi.domain, domain.mobi; and scours the regular website for links to a mobile version of the website. When application server 110 finds a mobile website, it collects details about the website including acceptable resolutions, existence of FLASH or JAVA content, amount and size of images, etc. Application server 110 then records this information in an internal database. Application server 110 also receives this information from third party database 116.

If application server 110 determines that no mobile websites are available, then application server 110 creates its own mobile version of that website. This creation process involves converting the regular website into a mobile website. The width of the page is reduced, and the embedded images are replaced with text links to the images. More sophisticated methods of conversion include reading JAVA and FLASH content and listing the text content. Alternate conversions include reducing the images to black and white instead of removing them. Once the mobile website is created it is stored in the internal database of application server 110. Application server 110 sends mobile communications device 100 the results of its search including any mobile websites created. Mobile communications device 100 utilizes the onboard policy management agent to select the optimal website to view on mobile communications device 100.

Service provider application server 110 frequently updates mobile communications device 100 with information concerning mobile sites. These updates may be push-based, pull-based, or on an on-demand basis. With push-based, the information is automatically transferred to mobile communications device 100 when there is new information. With pull-based, service provider application server 110 notifies mobile communications device 100 of an update and the user of mobile communications device 100 decides whether or not to download the update. With an on-demand basis, a user on mobile communications device 100 requests and receives an update from service provider application server 110.

Figure 2:
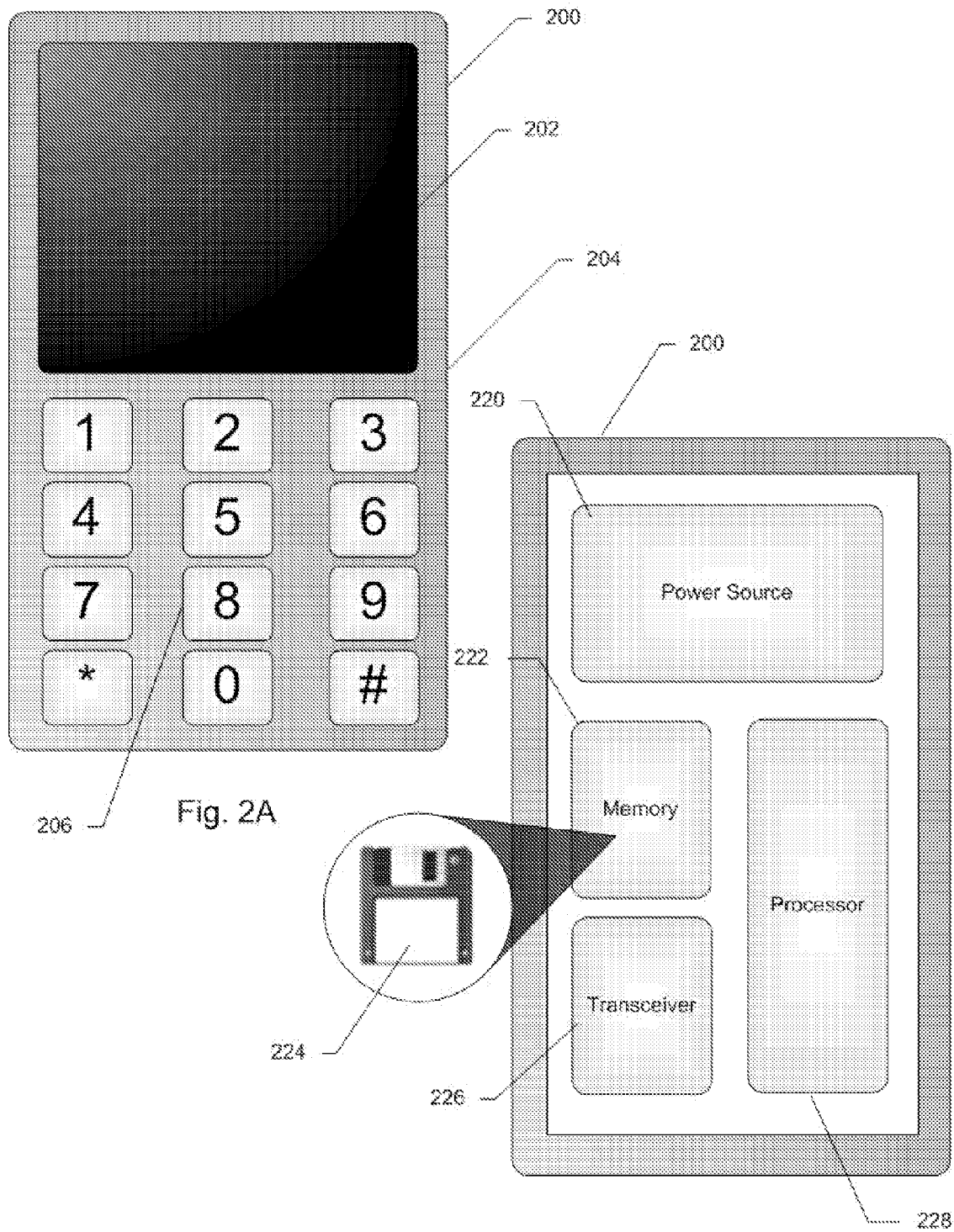
FIG. 2A shows a front view of a mobile communications device for use with a content access policy manager, according to an exemplary embodiment of the present invention.
FIG. 2B shows a view of components of mobile communications device, according to an exemplary embodiment of the present invention.

FIGS. 2A and 2B show a mobile communications device for use with a content access policy manager, according to an exemplary embodiment of the present invention.

FIG. 2A shows a front view of a mobile communications device 200 for use with a content access policy manager, according to an exemplary embodiment of the present invention. In this embodiment, the front of mobile communications device 200 comprises a housing 204, a display 202, and a keypad 206. Housing 204 is preferably composed of a rigid and durable material, such as plastic or metal, to hold the components in place and prevent the components from being significantly damaged. Display 202 is coupled to housing 204 and is used to view mobile communications device 200's visual output. In exemplary embodiments of the present invention, display 202 is a liquid crystal display (LCD). Keypad 206 allows a user to input numbers, input letters, select functions, play games, etc.

FIG. 2B shows a view of components of mobile communications device 200, according to an exemplary embodiment of the present invention. In this embodiment, the components comprise a memory unit 222, a processor 228, a transceiver module 226, a power source 220, and a policy management agent 224 on memory unit 222. Memory unit 222 stores an operating system for mobile communications device 200. Memory unit 222 additionally stores photos, music, games, telephone settings, telephone numbers, etc. Transceiver module 226 is utilized to communicate with wireless networks. This communication may use a cellular Radio Frequency (RF) connection, BLUETOOTH connection, WiFi connection, etc. Processor 228 runs the operating system of mobile communications device 200 as well as other features and programs. Power source 220 provides power to each of the components of communications device 200. Policy management agent 224 organizes websites available to the user. Policy management agent 224 is updated and receives information concerning new mobile websites or created websites on a periodic or as needed dynamic basis from a service provider application server. A user may open policy management agent 224 and select preferences for their browsing needs. Policy management agent 224 compares the user preferences with the attributes of available websites when selecting the optimal website to view on mobile communications device 200. Updates for policy management agent 224 can be push-based, pull-based, or on-demand based. The information sent to policy management agent 224 is stored on memory unit 222. In exemplary embodiments of the present invention, the information is periodically purged so as not to waste space on memory unit 222. In these embodiments, memory unit 222 may continue to store information about the most visited sites while purging information about less visited sites. In other exemplary embodiments the user may store the information on a removable memory unit.

Figure 3:
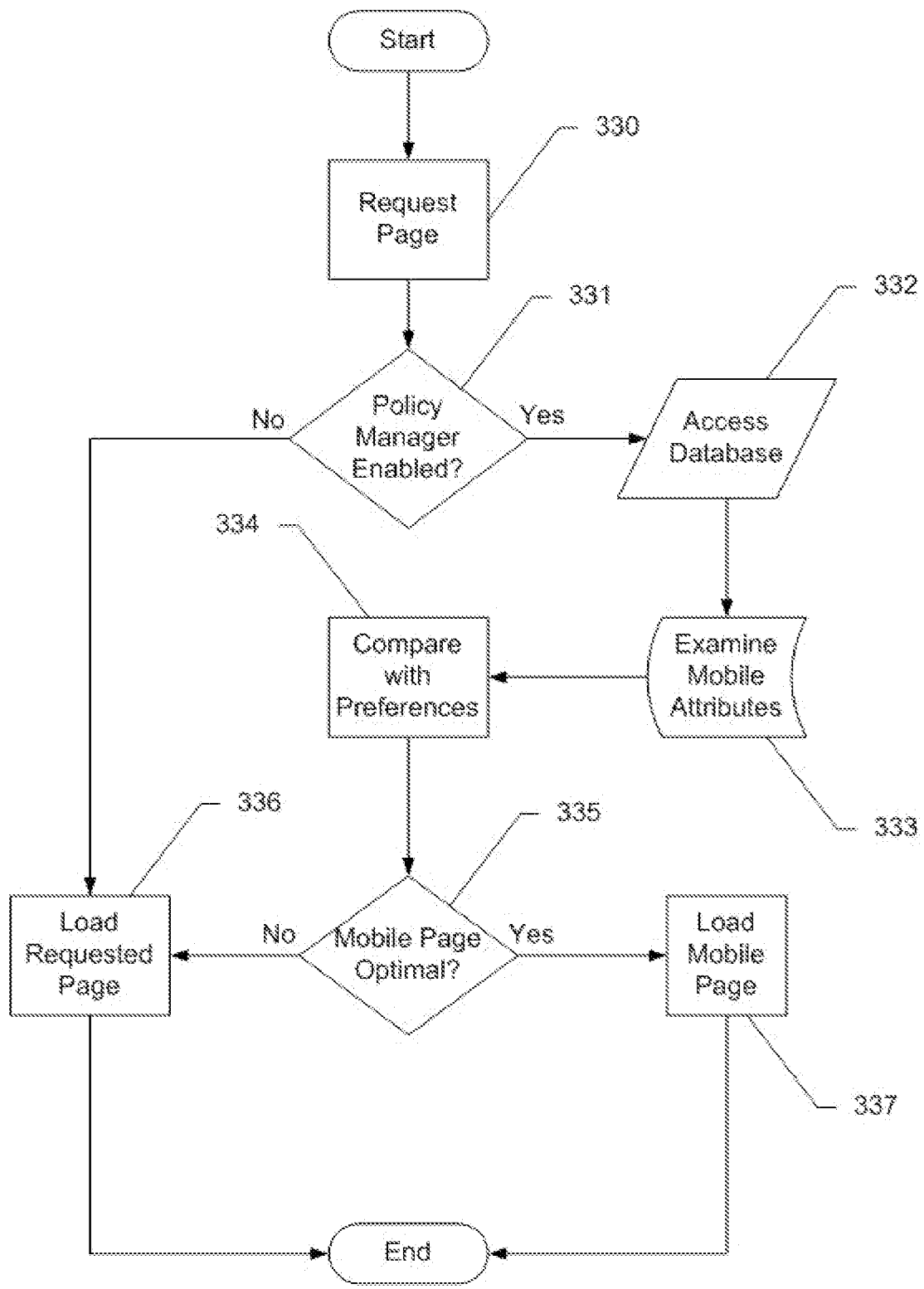
FIG. 3 shows a flowchart of a content access policy management system, according to an exemplary embodiment of the present invention.

FIG. 3 shows a flowchart of a content access policy management system, according to an exemplary embodiment of the present invention. In this embodiment, a user requests a webpage 330 on the web browser of the user's mobile communications device. The mobile communications device determines whether the policy management agent on the device is enabled 331. If the policy management agent is not enabled, the web browser loads the requested webpage 336 and the process ends. If the policy management agent is enabled, the policy management agent accesses a database 332 on the memory unit of the mobile communications device. The policy management agent searches the database to determine if other formats of the webpage are available. These other formats may be available mobile formats or alternatively are mobile websites created by an application server. The policy management agent examines the mobile attributes 333 of the different formats of the webpage. The attributes of each format is compared with programmed user preferences 334. For example, the user may have selected to view an html page when the mobile communications device has a signal capable of transferring high bandwidth but a mobile site when only low bandwidth is available. After the formats and preferences are compared, the policy management agent determines whether the mobile page is optimal 335 under the circumstances. If the mobile page is optimal, the mobile page is loaded 337 by the web browser. If the mobile page is not optimal under the circumstances, the originally requested page is loaded 336.

Figure 4:
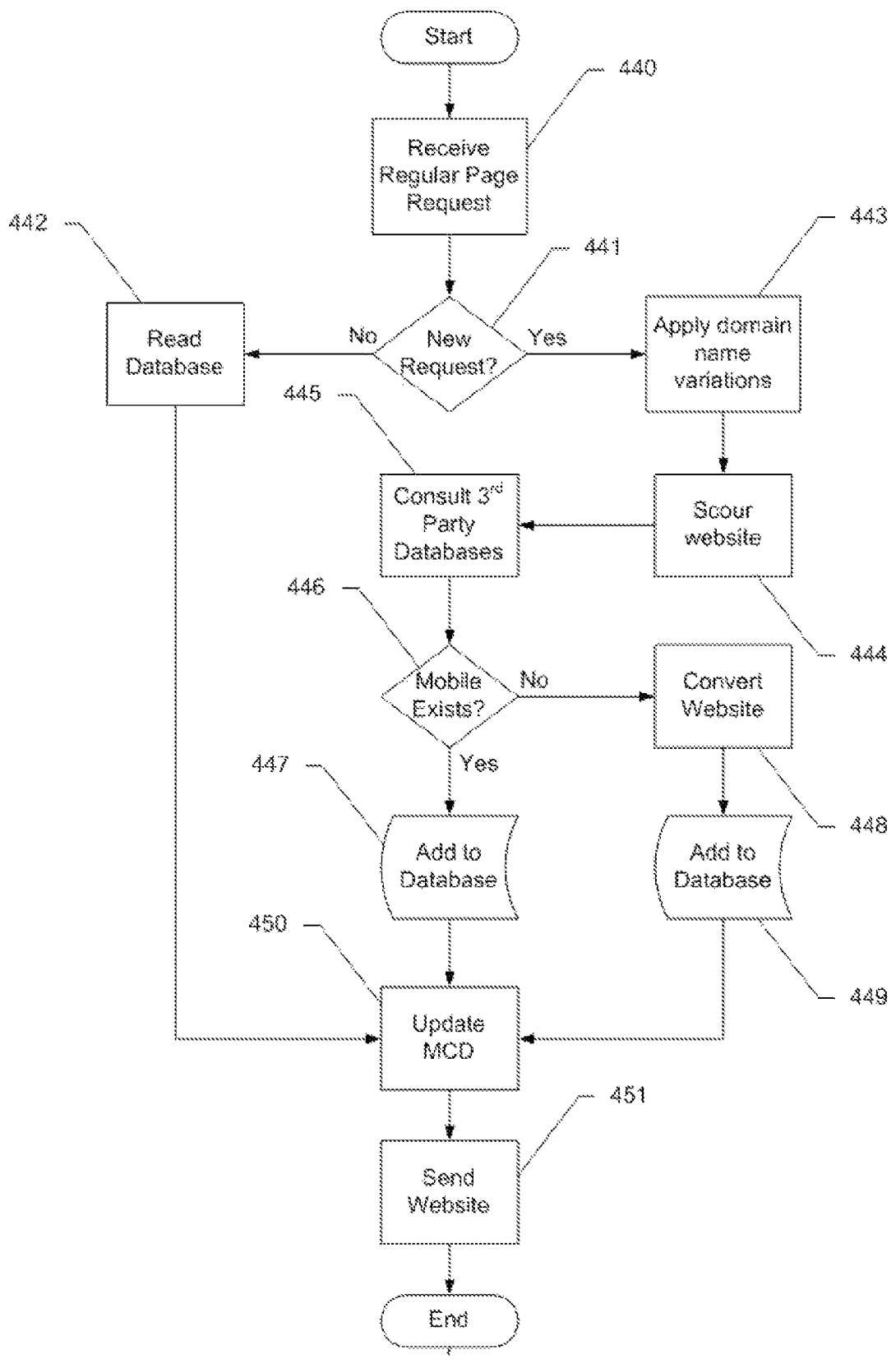
FIG. 4 shows a flowchart of the server side of a content access policy management system, according to an exemplary embodiment of the present invention.

FIG. 4 shows a flowchart of the server side of a content access policy management system, according to an exemplary embodiment of the present invention. In this embodiment the application server receives a regular webpage request 440 from a mobile communications device. The server queries whether the requested webpage is a new request 441 or a request that has been made before by any mobile communications device. If the request has previously been made, the application server reads a server database 442 to determine mobile sites that are available. The application server updates the requesting mobile communications device 450 with information from the database concerning available mobile websites. The application server then connects the mobile communications device with the appropriate website 451.

If the requested website is a new request, and thus not in the database, the application server searches for available mobile versions of the website 443. The application server applies domain name variations to the requested website. For example, the application server applies WAP and mobile prefixes to the domain name such as popular mobile variations of the domain name; e.g. m.domain, mmm.domain, wap.domain, mobi.domain, domain.mobi. The application server also scours 444 the requested website for links to any mobile versions of the site. The application server searches third-party databases 445 to determine whether these databases contain alternative mobile sites. These third party databases range from other service provider databases to independent websites featuring a collection of links to popular mobile websites. After searching each of these areas, the application server queries whether mobile sites have been found 446. If mobile sites exist, they are added to the server database 447. The application server updates the mobile communications device 450 with the mobile availability of the website and connects the mobile communications device to the website 451. If no mobile sites exist, the application server converts the website 448 to a mobile website. The mobile website is added to the server's database 449. The application server updates the mobile communications device 450 with the availability of the mobile website and connects the mobile communications device with the optimal website 451.

FIG. 5 shows a database entry 560 of website versions, according to an exemplary embodiment of the present invention. In this embodiment, database entry 560 comprises available sites as well as features and attributes 562 of the sites. Features and attributes 562 include the minimum resolution of the site, the average image size on the page, the number of images on the page, and the average total size of the page as well as whether the page contains FLASH or JAVA. For example, according to the figure, m.weather.com has a minimum resolution of 320×200 with an average image size of 5 KB, an average page size of 2 KB, and an average of six images per page. The page contains JAVA but not FLASH. The database entry is compared with the user's preferences and device capabilities to select the ideal site under the circumstances. The mobile communications device may have a 320×200 resolution with an acceptable bandwidth for handling the page and image sizes, but if the mobile communications device does not support JAVA, then the policy management agent determines that not all of the information may be viewed on this mobile communications device. Instead, the policy management agent opts for wap.weather.com.

Other embodiments of a database entry are more and less complex than shown in FIG. 5. Other website attributes such as sound availability can be included. Some websites link to Portable Document Format (PDF) files, MICROSOFT WORD (doc) files, archives (zip), and other file formats that not every mobile communications device can handle. Security has also become a concern recently, especially for mobile users. The security level or amount of encryption is another factor that may become useful in a database entry.

FIG. 6 shows a selection screen 670 of user options for a content access policy management system, according to an exemplary embodiment of the present invention. In this embodiment, selection screen 670 is shown on a display 602 of a mobile communications device 600. Selection screen 670 includes bandwidth columns 672 and attribute rows 674. The location on selection screen 670 where a bandwidth column 672 intersects an attribute row is a maximum value 676 of the attribute at that bandwidth. The user may set these maximums for each attribute under the bandwidth constraint.

For example, between 1 and 3 Mbps, the user has selected to allow a minimum resolution of up to 320×240, an average image size of 70 kB, an average page size of 20 kB, and the user has put no limit on the number of images allowed on the page. FLASH enabled pages are not allowed, but JAVA enabled pages are. The most complete webpage, content-wise, that meets the specified attributes is displayed under each of the bandwidth conditions. If attributes of the website do not fit within the user selected maximums for each attribute, a mobile site that does fit is displayed. In embodiments of the present invention, an application server creates WAP sites where none are otherwise available. In alternative embodiments of the present invention, the selection screen is accessed by a personal computer or by communicating with a service representative.

Other embodiments of the selection screen are designed to accommodate more sophisticated and less sophisticated users. A less sophisticated user may not understand or want to take the time to calculate and enter every acceptable maximum. For these users, the policy management agent simply asks how much information the user is looking for. A simple selection of high, medium, or low automatically fills in the table entries. A selection of high (information) results in allowing full websites more often than mobile websites. A selection of low (information) results in allowing mobile websites more often than full websites. A selection of medium (information) balances in between high and low. A more sophisticated user may want more options and more control over the selection screen. For these users a selection screen with more options is included. These users may also wish to enable an option whereby every time a website is visited the policy management agent simply asks the user which of the website versions the user wishes to visit. That way, the sophisticated user can decide right then and there which site to visit based on the circumstances. To aid the user in this decision, the query is accompanied by a showing of the current bandwidth available.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A mobile communications device comprising:
a processor; and
a memory that stores instructions that, when executed by the processor, cause the processor to perform operations comprising
storing a plurality of alternate addresses for a web site on an onboard database of websites, the onboard database of websites being stored on the memory, the plurality of alternate addresses corresponding to mobile versions of the web site, the mobile versions of the website comprising attributes,
receiving a request for the website,
determining a user preference corresponding to a connection speed associated with the mobile communications device, wherein the user preference comprises at least one attribute associated with a plurality of values and wherein the plurality of values is defined based on a plurality of connection speeds,
performing a comparison between the user preference and the attributes of the mobile versions of the website to determine a mobile version of the website from the mobile versions of the website that meets the user preference,
selecting the mobile version of the website from the mobile versions of the website that meets the user preference as an optimal website in response to the request, and
receiving, from an application server, an update comprising availability information associated with further mobile versions of the website.

2. The mobile communications device of claim 1, wherein the attributes of the mobile versions of the website comprise addresses, minimum resolutions, image sizes, page sizes, images-per-page, a FLASH inclusion, and a JAVA inclusion.

3. The mobile communications device of claim 1, wherein the user preference comprises at least one of a maximum resolution, an image size, a page size, or a number of images-per-page.

4. The mobile communications device of claim 1, further comprising a transceiver in communication with the memory.

5. The mobile communications device of claim 1, wherein the update is pushed to the mobile communications device.

6. A mobile communications device comprising:
a display;
a processor; and
a memory that stores instructions that, when executed by the processor, cause the processor to perform operations comprising
storing a plurality of alternate addresses for a web site on an onboard database of websites, the onboard database of websites being stored on the memory, the plurality of alternate addresses corresponding to mobile versions of the web site, the mobile versions of the website comprising attributes,
receiving a request for the website,
in response to receiving the request for the website, providing, on the display, a query comprising the attributes associated with the mobile versions of the website and a current connection speed associated with the mobile communications device,
in response to the query, receiving a selection of a mobile version of the website from the mobile versions of the website as an optimal website, and receiving, from an application server, an update comprising availability information associated with further mobile versions of the website.

7. The mobile communications device of claim 6, wherein the attributes of the mobile versions of the website comprise at least one of an average page size, an average image size, an average of images per page, a JAVA enablement, or a FLASH enablement.

8. The mobile communications device of claim 6, wherein the application server is in communication with a third party database.

9. The mobile communications device of claim 8, wherein the third party database contains the further mobile versions of the website.

10. The mobile communications device of claim 6, wherein the mobile versions of the web site comprise a mobile version of the website created by an application server.

11. A method comprising:
    storing, at a mobile communications device comprising a processor, a plurality of alternate addresses for a web site, the plurality of alternate addresses corresponding to mobile versions of the web site, the mobile versions of the website comprising attributes;
    receiving, at the mobile communications device, a request for the website;
    determining, by the mobile communications device, a user preference corresponding to a connection speed associated with the mobile communications device, wherein the user preference comprises at least one attribute associated with a plurality of values, wherein the plurality of values is defined based on a plurality of connection speeds;
    performing, by the mobile communications device, a comparison between the user preference and the attributes of the mobile versions of the website to determine a mobile version of the website from the mobile versions of the website that meets the user preference;
    selecting, by the mobile communications device, the mobile version of the website from the mobile versions of the website that meets the user preference as an optimal website in response to the request; and
    receiving, by the mobile communications device from an application server, an update comprising availability information associated with further mobile versions of the website.

12. The method of claim 11, further comprising sending a request for a regular version of the website.

13. The method of claim 11, further comprising searching for the mobile versions of the website.

14. The method of claim 11, wherein at least a portion of the further mobile versions of the website is located via a link associated with the website.

15. The method of claim 11, wherein at least a portion of the further mobile versions of the website is provided by a third-party database.

16. The method of claim 11, wherein at least a portion of the further mobile versions of the website is created by an application server.

17. The method of claim 11, further comprising displaying the optimal website on the mobile communications device.

18. The method of claim 11, wherein the user preference comprises at least one of a maximum resolution, an image size, a page size, or a number of images-per-page.

\* \* \* \* \*